US 8,472,354 B2

(12) United States Patent
Gillipalli et al.

(10) Patent No.: US 8,472,354 B2
(45) Date of Patent: Jun. 25, 2013

(54) METHOD AND SYSTEM FOR PROVIDING CUSTOM CALL WAITING

(75) Inventors: Vamshi Gillipalli, Irving, TX (US); Peter Swamidas, Irving, TX (US); Amit Patadia, Plano, TX (US); John Valdez, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 255 days.

(21) Appl. No.: 12/652,913

(22) Filed: Jan. 6, 2010

(65) Prior Publication Data

US 2011/0164535 A1 Jul. 7, 2011

(51) Int. Cl.
*H04L 12/16* (2006.01)
*H04Q 11/00* (2006.01)

(52) U.S. Cl.
USPC ............................. 370/261; 370/263; 370/270

(58) Field of Classification Search
USPC .................................. 370/259–261, 263, 270
See application file for complete search history.

(56) References Cited

U.S. PATENT DOCUMENTS

| 5,995,825 | A | * | 11/1999 | Hietalahti | 455/414.4 |
|-----------|-----|---|---------|-----------|-----------|
| 6,950,504 | B1 | * | 9/2005 | Marx et al. | 379/88.19 |
| 7,418,091 | B1 | * | 8/2008 | Sylvain | 379/215.01 |
| 2002/0077089 | A1 | * | 6/2002 | Contreras | 455/415 |
| 2003/0063590 | A1 | * | 4/2003 | Mohan et al. | 370/338 |
| 2003/0142662 | A1 | * | 7/2003 | Mahajan | 370/352 |
| 2005/0107072 | A1 | * | 5/2005 | True et al. | 455/414.1 |
| 2007/0121876 | A1 | * | 5/2007 | McCormick | 379/215.01 |
| 2007/0268904 | A1 | * | 11/2007 | van Bemmel | 370/392 |
| 2008/0144783 | A1 | * | 6/2008 | Kumar et al. | 379/88.13 |
| 2008/0146203 | A1 | * | 6/2008 | Khawand et al. | 455/414.1 |
| 2011/0111735 | A1 | * | 5/2011 | Pietrow | 455/414.1 |

* cited by examiner

*Primary Examiner* — Ronald Abelson

(57) ABSTRACT

An approach for providing custom call waiting with media messaging is disclosed. A request is received from a first voice station to establish a voice communication session with a called party station. A detection is made that the called party station is currently in communication with a second voice station. A content designated from a call-waiting condition for presentation to a caller is retrieved. The content to either the first voice station or the second voice station is retrieved in response to a user input from the called party device.

17 Claims, 9 Drawing Sheets

FIG. 5B

```
SIP/2.0 710 710 BUSY_ARM
Via: SIP/2.0/UDP pc33.atlanta.com;branch=z9hG4bK776asdhds
Max-Forwards: 70
To: Bob <sip:Charlie@charlotte.com>
From: Alice <sip:alice@atlanta.com>;tag=1928301774
Call-ID: a84b4c76e66710@pc33.atlanta.com
CSeq: 314159 BUSY
Contact: <sip:alice@pc33.atlanta.com>
Content-Type: application/sdp
Content-Length: 142
Custom-Msg: 2
```

550

551

METHOD AND SYSTEM FOR PROVIDING CUSTOM CALL WAITING

BACKGROUND INFORMATION

The popularity and convenience of the Internet has resulted in the reinvention of traditional telephony services. These services are offered over a packet switched network with minimal or no cost to the users. IP (Internet Protocol) telephony, thus, have found significant success, particularly in the long distance market. In general, IP telephony, which is also referred to as Voice-over-IP (VOIP), is the conversion of voice information into data packets that are transmitted over an IP network. Such technology has reduced telecommunication costs and enhanced users' convenience in seamlessly employing computing and communication applications and services. The development of telephony services, in this context, poses tremendous engineering challenges in that the merger, for example, of traditional call features, e.g., call waiting, with new capabilities (made possible by the data infrastructure) require preserving interoperability with existing telephony infrastructure. Another driving force for the continual development of these services is the desire for service providers to remain competitive.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 5A and 5B are diagrams, respectively, of a process for providing content to a call waiting calling party using the session initiation protocol (SIP), and an associated busy message, according to various embodiments;

DESCRIPTION OF THE PREFERRED EMBODIMENT

A preferred method and system for providing custom call waiting with media messaging is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to the session initiation protocol (SIP) and the call waiting feature, it is contemplated that various exemplary embodiments are also applicable to other equivalent packetized voice communication protocols and equivalent call features.

Figure 1:
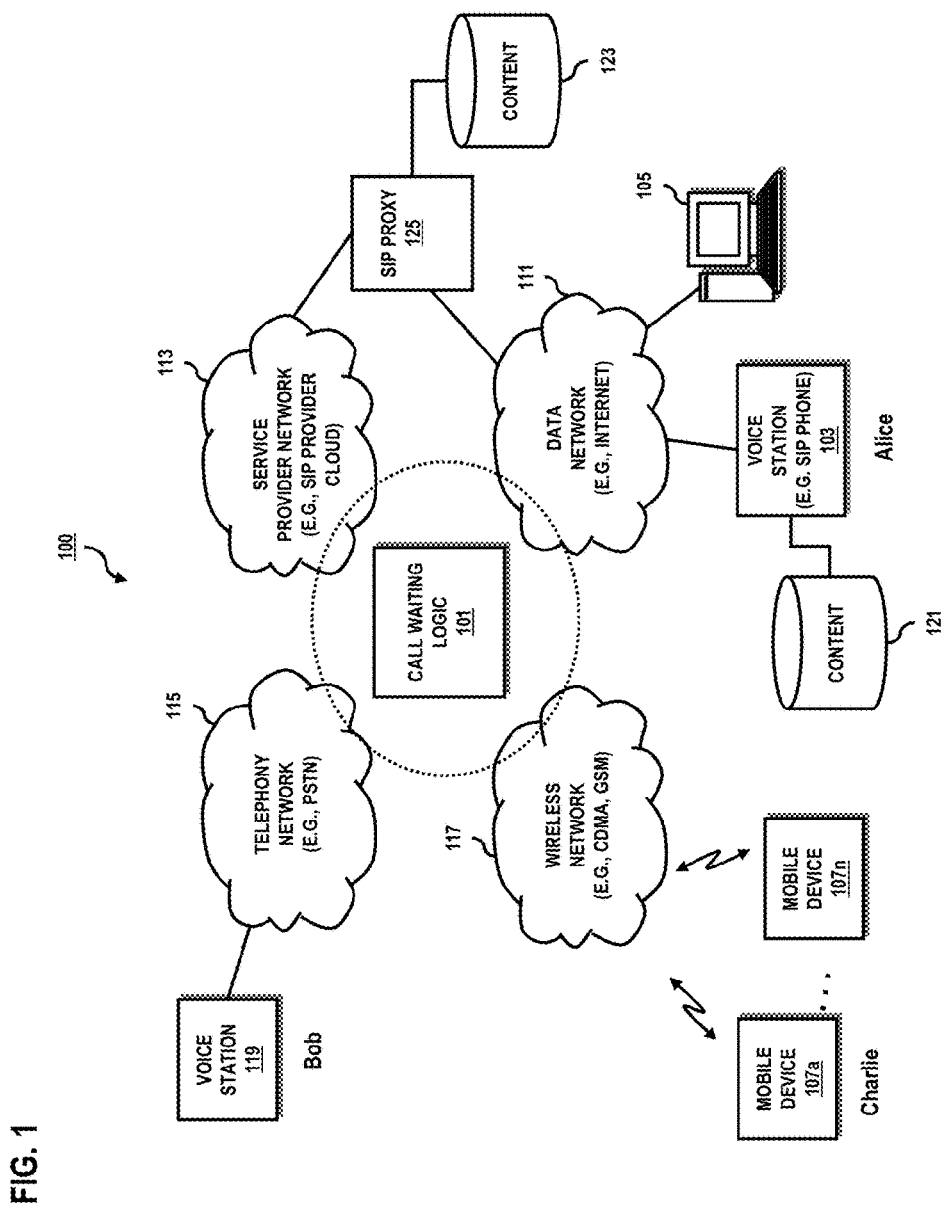
FIG. 1 is a diagram of a communication system capable of providing custom call waiting with media messaging, according to various embodiments.

FIG. 1 is a diagram of a communication system capable of providing custom call waiting with media messaging, according to various embodiments. For illustrative purposes, system 100 provides packetized voice communications (e.g., Voice over Internet Protocol (VoIP)) supporting a call waiting feature. Among the many traditional call features that have become the stable of telephony services is call waiting. This call waiting feature permits a called party, who is participating in a voice call with another caller, to be notified of another incoming call and to accept such a call from the new caller by putting the other caller on hold. Such feature enables the called party to efficiently handle multiple calls, and also to avoid the expense of procuring another communication line. In the context of current VoIP telephony devices, a called party cannot provide a message to a call waiting incoming call without interrupting the existing call.

Therefore, the approach of system 100, according to certain exemplary embodiments, stems from the recognition that disruption of existing voice communication sessions can be unacceptable at times, particularly if the call is important. However, it is also recognized that providing notification to the party of the incoming calls would be useful, as to minimize "missing" other calls.

As shown, a call waiting logic 101 can exist anywhere (e.g., switch, gateway, etc.) within system 100 to provide a call waiting feature to various end user devices 103-107. For example, these end user devices can include a voice station 103, which is configured as a VoIP phone that utilizes the session initiation protocol (SIP) as well as a computer 105. The computer 105 can execute a "softphone" utilizing VoIP, for instance. Moreover, the end user devices may include one or more mobile devices 107a-107n configured to execute a VoIP application.

In system 100, according to certain embodiments, one or more networks, such as data network 111, service provider network 113, telephony network 115, and/or wireless network 117, are provided to handle various communication sessions, voice communications as well as non-voice communications. Networks 111-117 may be any suitable wireline and/or wireless network, and be managed by one or more service providers. For example, telephony network 115 may include a circuit-switched network, such as the public switched telephone network (PSTN), an integrated services digital network (ISDN), a private branch exchange (PBX), or other like network. Wireless network 117 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 111-117 may be completely or partially contained within one another, or may embody one or more of the aforementioned infrastructures. For instance, service provider network 113 may embody circuit-switched and/or packet-switched networks that include facilities to provide for transport of circuit-switched and/or packet-based communications. According to one embodiment, service provider network 113 can include a SIP provider cloud that comprises one or more SIP servers (not shown). SIP has emerged to address the signaling of calls over an IP network. As an end-to-end protocol, SIP advantageously permits the end nodes with the capability to control call processing. By contrast, traditional telephony services are totally controlled by the intermediate network components; that is, the switches have full control over call establishment, switching, and call termination. In the SIP architecture, it is sometimes desirable for an intermediate network element to control the call processing. For example, codec (coder/decoder) incompatibility may require network intervention to ensure that the exchange of packets are meaningful.

It is further contemplated that networks 111-117 may include components and facilities to provide for signaling and/or bearer communications between the various components or facilities of system 100. In this manner, networks 111-117 may embody or include portions of a signaling system 7 (SS7) network, or other suitable infrastructure to support control and signaling functions.

Using a VoIP telephony device, such as voice station 103, a user is engaged in a voice communication session (i.e., call) with a voice station 119 over the PSTN 115, and receives an incoming call waiting call from mobile device 107a. Voice station 103 (i.e., called party device) rather than switching over to the incoming call, is provided with an option to send content, e.g., a message, a media stream (e.g., video, recorded audio, etc), or a combination thereof, to the mobile device 107a (associated with the call waiting calling party) so that the first call with the voice station 119 is not interrupted. In an alternative embodiment, the called party device, i.e., voice station 103 in this example, can switch from the first call to the second call using call waiting switchover; and after the switchover, the called party device (voice station 103) can elect to terminate the first call, sending the message and/or media (e.g., text, video, recorded audio, or application) to the device (voice station 119) of the first party.

As seen in FIG. 1, the content can be stored locally within the voice station 103, as within content database 121. Alternatively, the content can reside within the network (e.g., service provider network 113 or data network 111) using database 123. According to one embodiment, the content database 123 accessible by a SIP proxy server 125. Furthermore, the content can be stored within one or more SIP servers (not shown) of SIP provider cloud of network 113.

According to exemplary embodiments, end user devices 103-107 and 119 may include any customer premise equipment (CPE) capable of sending and/or receiving information over one or more of networks 111-117. For instance, voice station (or terminal) 119 may be any suitable plain old telephone service (POTS) device, facsimile machine, etc., whereas mobile device (or terminal) 107 may be any cellular phone, radiophone, satellite phone, smart phone, wireless phone, or any other suitable mobile device, such as a personal digital assistant (PDA), pocket personal computer, tablet, customized hardware, etc. Further, computing device 105 may be any suitable computing device, such as a VoIP phone, skinny client control protocol (SCCP) phone, session initiation protocol (SIP) phone, IP phone, personal computer, softphone, workstation, terminal, server, etc.

Four possible scenarios exist with the placement of a VoIP call: (1) phone-to-phone, (2) phone-to-PC, (3) PC-to-phone, and (4) PC-to-PC. In the first scenario of phone-to-phone call establishment, voice station 119 is switched through PSTN 115 by a switch to a VoIP gateway (not shown), which forwards the call through the IP network 111. The packetized voice call is then routed through the IP network 111, exiting the IP network 111 at an appropriate point to enter the PSTN 115 and terminates at voice station 119. Under the second scenario, a voice station places a call to PC through a switch to the PSTN 115. This voice call is then switched by the PSTN 115 to a VoIP gateway (not shown), which forwards the voice call to a PC via the IP network 111. The third scenario involves a PC that places a call to a voice station. Using a voice encoder, the PC introduces a stream of voice packets into the IP network 111 that are destined for a VoIP gateway (not shown). The VoIP gateway (with the SIP provider cloud) converts the packetized voice information into a POTS (Plain Old Telephone Service) electrical signal, which is circuit switched to the voice station. Lastly, in the fourth scenario, a PC establishes a voice call with a PC; in this case, packetized voice data is transmitted from the PC via the IP network 111 to another PC, where the packetized voice data is decoded.

A detailed discussion of SIP and its call control services are described in IETF RFC 2543 and IETF Internet draft "SIP Call Control Services", Jun. 17, 1999; both of these documents are incorporated herein by reference in their entireties. SIP messages are either requests or responses. SIP defines a user agent client (UAC) or a user agent server (UAS), depending on the services that the system 100 is executing. In general, a user agent client issues requests, while a user agent server provides responses to these requests.

SIP defines six types of requests, which are also referred to as methods. The first method is the INVITE method, which invites a user to a conference. The next method is the ACK method, which provides for reliable message exchanges for invitations in that the client is sent a confirmation to the INVITE request. That is, a successful SIP invitation includes an INVITE request followed by an ACK request.

Another method is the BYE request, which indicates to the UAS that the call should be released. In other words, BYE terminates a connection between two users or parties in a conference. The next method is the OPTIONS method; this method solicits information about capabilities and does not assist with establishment of a call. Lastly, the REGISTER provides information about a user's location to a SIP server.

To better appreciate the call waiting mechanism of system 100, it is instructive to describe the protocol suite governing the exchange of the voice packets, as explained below.

Figure 2A:
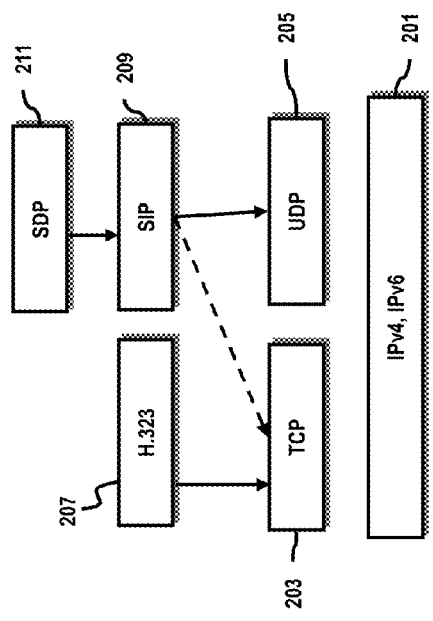
FIGS. 2A-2C are diagrams of a protocol architecture and associated messages for supporting packetized voice communication sessions, according to one embodiment.
Figure 2C:
Figure 2B:

FIGS. 2A-2C are diagrams of a protocol architecture and associated messages for supporting packetized voice communication sessions, according to one embodiment. The layered nature of the architecture provides protocol separation and independence, whereby one protocol can be exchanged or modified without affecting the other higher layer or lower layer protocols. It is advantageous that the development of these protocols can occur concurrently and independently. As seen in FIG. 2A, the foundation of the architecture rests with the IP layer 201. The IP layer 201 provides an unreliable, connectionless data delivery service at the network level. The service is "unreliable" in the sense that the delivery is on a "best effort" basis; that is, no guarantees of packet delivery are made. IP is the de facto Internet working protocol standard. Current standards provide two versions of IP: Version 4 and Version 6. One of the key differences between the versions concerns addressing; under Version 4, the address fields are 32 bits in length, whereas in Version 6, the address field has been extended to 128 bits.

Above the IP layer 201 are the TCP (Transmission Control Protocol) 203 and the UDP (User Datagram Protocol) 205. The TCP layer 203 provides a connection-oriented protocol that ensures reliable delivery of the IP packets, in part, by performing sequencing functions. This sequencing function reorders any IP packets that arrive out of sequence. In contrast, the User Datagram Protocol (UDP) 205 provides a connectionless service that utilizes the IP protocol 201 to send a data unit, known as a datagram. Unlike TCP 203, UDP 205 does not provide sequencing of packets, relying on the higher layer protocols to sort the information. UDP 205 is preferable over TCP 203 when the data units are small, which saves processing time because of the minimal reassembly time.

The next layer in the IP telephony architecture of FIG. 2A supplies the necessary IP telephony signaling and includes the H.323 protocol 207 and the Session Initiation Protocol (SIP) 209. The H.323 protocol 207, which is promulgated by the International Telecommunication Union (ITU), specifies a suite of protocols for multimedia communication. SIP 209 is a competing standard that has been developed by the Internet Engineering Task Force (IETF). SIP 209 is a signaling protocol that is based on a client-server model. It should be noted that both the H.323 protocol 207 and SIP 209 are not limited to IP telephony applications, but have applicability to multimedia services in general. In one embodiment, SIP 209 is used to create and terminate voice calls over an IP network 111. However, it is contemplated that the H.323 protocol 207 and similar protocols can be utilized in lieu of SIP 209. Above SIP 209 is the Session Description Protocol (SDP) 211, which provides information about media streams in the multimedia sessions, as to permit the recipients of the session description to participate in the session.

Similar to other IETF protocols (e.g., the simple mail transfer protocol (SMTP) and Hypertext Transfer Protocol (HTTP)), SIP 209 is a textual protocol. As indicated earlier, SIP 209 is a client-server protocol, and as such, clients generate requests that are responded to by the servers.

To implement the call waiting mechanism of system 100, two new SIP extensions methods and response codes (along with certain attributes) are introduced, as illustrated in FIGS. 2B and 2C. Notably, a busy—ARM (audio recorded message) message 221 is provided to notify the network to retrieve content for delivery to an incoming calling party device, while a release hold message 231 provides delivery of the content to the original (or first) party device, which is placed on hold. It is noted that other SIP extensions can be derived depending on the use case. These SIP extensions can simply be supplied to the SIP provider cloud—i.e., one or more SIP servers can be appropriately configured to recognize the busy—ARM message 221 and the release hold message 231.

Figure 3B:
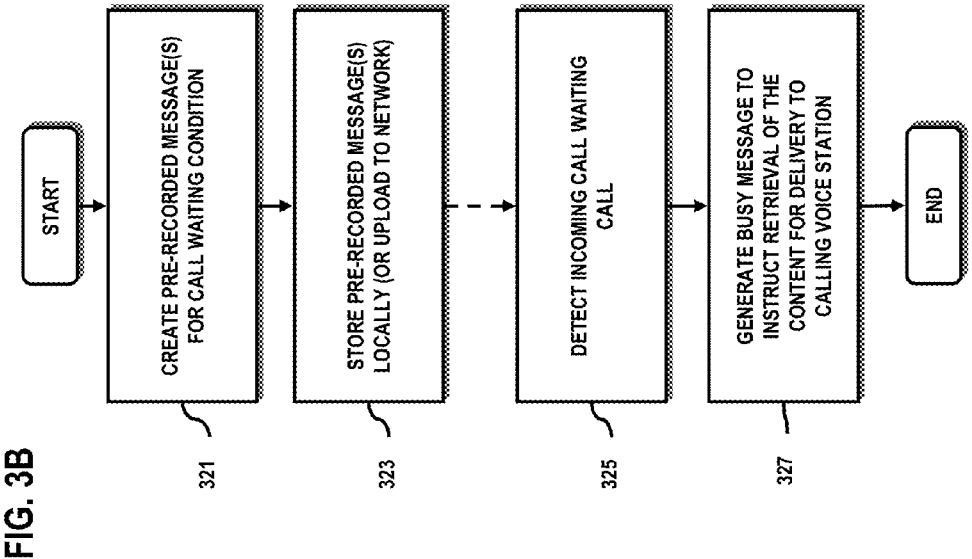
FIGS. 3A and 3B are flowcharts of processes for providing content to a call waiting calling party, according to various embodiments.
Figure 3A:
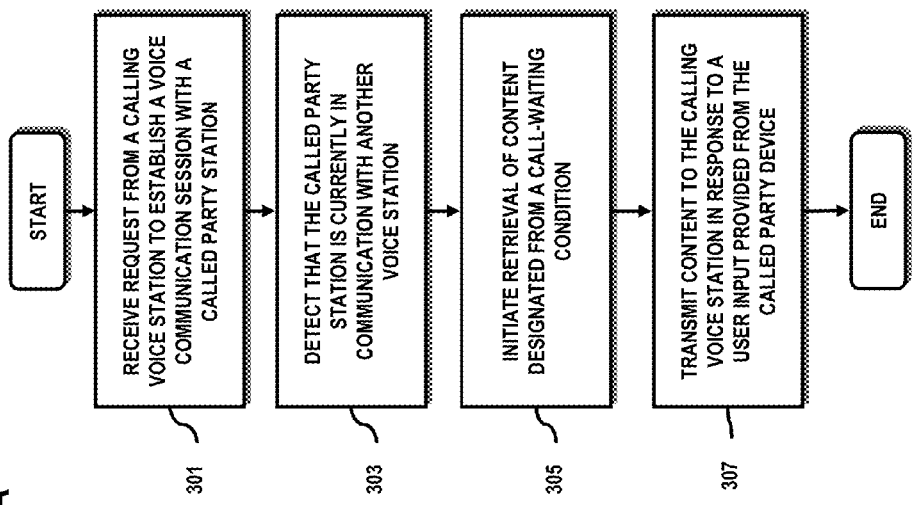

FIGS. 3A and 3B are flowcharts of processes for providing content to a call waiting calling party, according to various embodiments. In step 301, a request is received from a calling voice station (e.g., mobile device 107*a*) to establish a voice communication session with a called party station, e.g., voice station 103. The process, as in step 303, detects that the called party station 103 is currently in communication with another voice station 119—i.e., the called party station 103 was already engaged in a voice communication session with this station 119. In step 305, the process initiates retrieval of content that is designated from a call-waiting condition. Subsequently, the content is retrieved for presentation to the caller of the calling voice station 107*a*. The content is transmitted, per step 307, to the calling voice station 107*a* in response to a user input provided from the called party device 103. According to one embodiment, the above process is performed by the network—e.g., SIP proxy 125.

On the device side (as shown in FIG. 3B), voice station 103, as the called party device, prior to the call waiting incoming call, the user has created one or more pre-recorded messages that are to be played during a call waiting condition, as in step 321. In step 323, the pre-recorded messages are stored either locally within database 121 or is uploaded to database 123. According to one embodiment, the content includes either a pre-recorded message, media, or a combination of thereof. During this process, the called voice station 103 is prompted to select the content from a variety of contents for presentation to the caller.

Subsequently, in step 325, during a call waiting situation, voice station 103 detects an incoming call waiting call from mobile 107*a*, for instance. In one embodiment, voice station 103 generates a busy message according to the session initiation protocol (SIP), per step 327. The busy message specifies a busy condition associated with the called party station, and instructs the retrieval of the content for delivery to the calling voice station. The operation of the call waiting feature, according to above approach, is provided using SIP methods and responses, as more fully detailed with respect to FIGS. 5A and 5B.

The above arrangement advantageously permits the calling party to be notified by the called party (who is engaged in another call), and to receive media that is selected by the called party. In this manner, the calling party can better assess how to best handle the unavailable status of the called party.

Figure 4B:
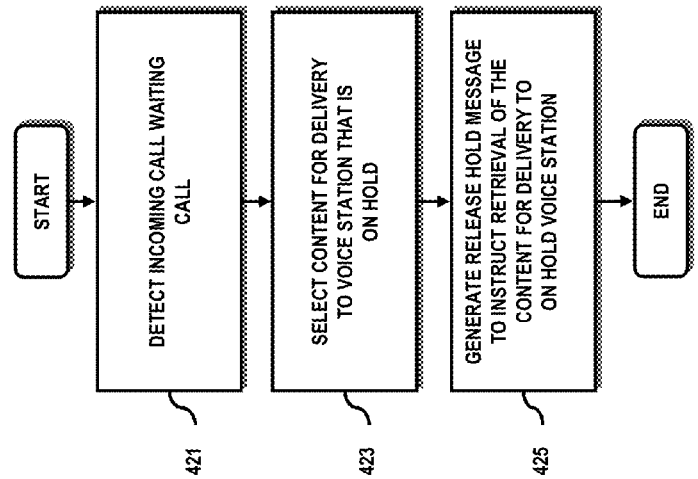
FIGS. 4A and 4B are flowcharts of processes for providing content to a caller on hold during a calling waiting condition, according to various embodiments.
Figure 4A:
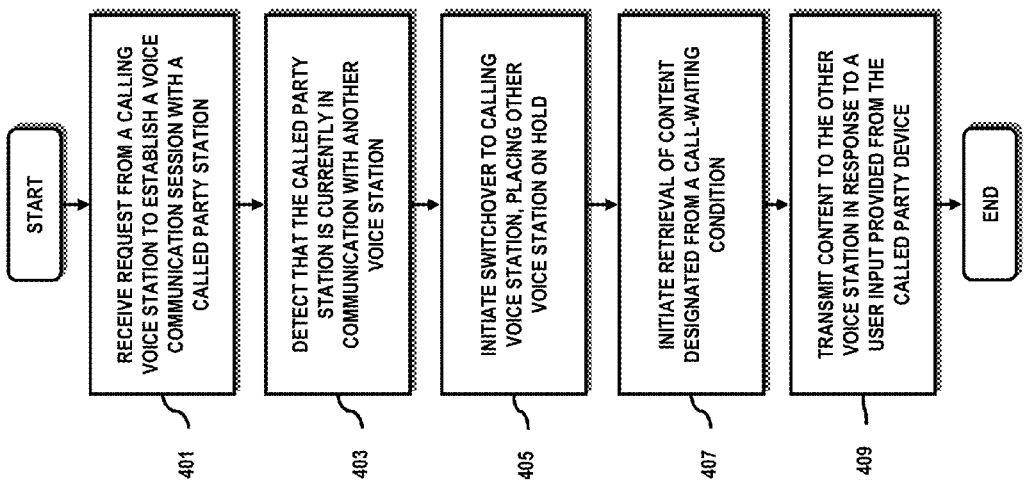

FIGS. 4A and 4B are flowcharts of processes for providing content to a caller on hold during a calling waiting condition, according to various embodiments. Under this scenario, a voice communication session is established between two voice stations 103*a* and 119. Unlike the process of FIG. 3A, this process sends content (e.g., recorded message and/or media) to the party that is on hold, rather than the calling party device. As shown, the mobile device 107*a*, as the calling voice station, generates a request to establish a voice communication session with a called party station, e.g., voice station 103 (step 401). In step 403, the process detects that voice station 103 is already engaged in another call with, for example, voice station 119. In step 405, a switchover to the calling voice station, mobile device 107*a*, is initiated, thereby placing voice station 119 on hold. The process then proceeds to acquire content either from the called voice station 103 or from the network, as in step 407. The user of the called party station 103 can, in one embodiment, can specified which pre-recorded message and/or media to forward to the on hold station 119. Thereafter, the content is transmitted to the voice station 119 (step 409).

From the perspective of the called party station (as shown in FIG. 4B), an incoming call waiting call is detected, per step 421. This call can be indicated by an audio and/or visual indicator, for example. In step 423, the user can select the particular content to be played to the party on hold. Alternatively, the user can specify a default, thereby automatically designating certain content that is to be forwarded. In step 425, the called voice station 103 generates a release hold message, according to the session initiation protocol (SIP), to instruct the network (e.g., SIP proxy 125) to retrieve the proper content for delivery to the on hold voice station 119. Details of the call waiting feature implemented using SIP is more fully described below in FIGs. Hence, a switchover to the calling voice station 107*a* is initiated by placing the voice station 119 on hold, wherein the transmission of the content is to this on hold voice station 119. Thereafter, the communication session with this voice station 119 is terminated.

Figure 5A:
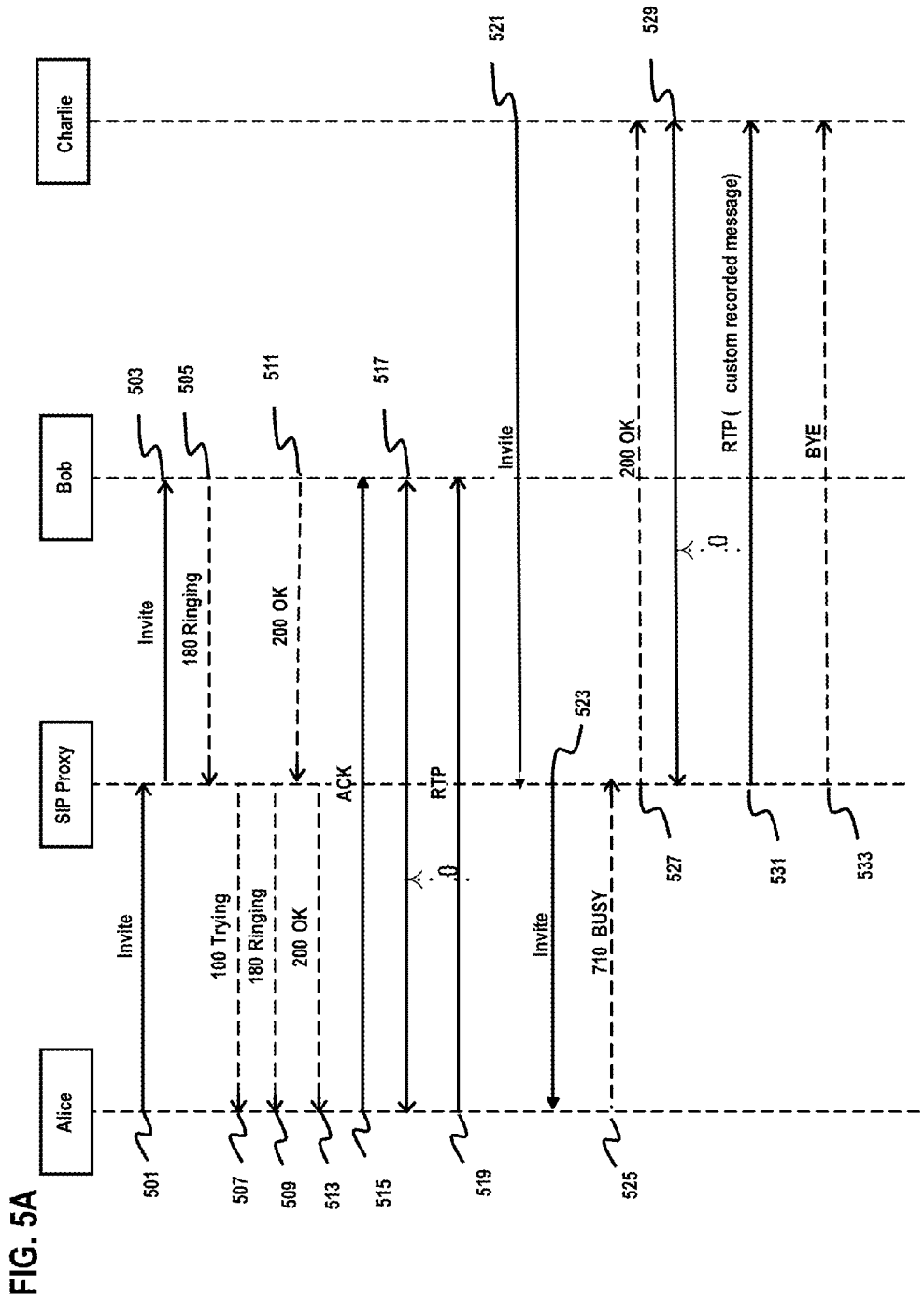

FIGS. 5A and 5B are diagrams, respectively, of a process for providing content to a call waiting calling party using the session initiation protocol (SIP), and an associated busy message, according to various embodiments. For the purposes of explanation, the parties and associated devices involved with the calling waiting mechanism are now described using names of the parties: "Alice," "Bob," and "Charlie." As shown in FIG. 1, Alice utilizes a SIP phone 103, while Bob employs voice station 119 and Charlie, mobile device 107a. It is recognized that any SIP-enabled device can be utilized. Also, the interaction of these devices 103, 107a and 119 is described with respect to the SIP proxy 125 (e.g., SIP proxy server).

Per FIG. 5A, initially, Alice seeks to communicate with Bob, and thus, sends an INVITE to Bob via SIP Proxy 125, per steps 501 and 503. An exemplary INVITE message is provided below in Table 1:

TABLE 1

INVITE sip:bob@biloxi.com SIP/2.0
 Via: SIP/2.0/UDP pc33.atlanta.com;branch=z9hG4bK776asdhds
  Max-Forwards: 70
  To: Bob <sip: bob@biloxi.com>
  From: Alice <sip:alice@atlanta.com>;tag=1928301774
  Call-ID: a84b4c76e66710@pc33.atlanta.com
  CSeq: 314159 INVITE
  Contact: <sip:alice@pc33.atlanta.com>
  Content-Type: application/sdp
  Content-Length: 142

In reply, Bob submits a 180 RINGING response, as in step 505, to the SIP Proxy 125, which subsequently communicates a 100 TRYING message to Alice (step 507). Additionally, SIP Proxy 125 sends the 180 RINGING response, as in step 509. In step 511, Bob forwards a 200 OK response, which is relayed by the SIP Proxy 125 to Alice (step 513). In turn, Alice provides an acknowledgement message, ACK, to Bob (step 515), and the two parties can begin to communicate (step 517), exchanging RTP messages (step 519). Hence, a voice communication session is established between Alice and Bob.

Thereafter, in steps 521 and 523, Charlie seeks to communicate with Alice, and thus, sends an INVITE to Bob via SIP Proxy 125. Alice receives call waiting Caller Identification (ID) indicating that Charlie is on the line. At this point, Alice can select a pre-recorded message that is to be played to Charlie by using a keypad on the SIP phone 103 to provide a user input. Table 2 illustrates an example of pre-recorded messages specified by Alice, and the code assignment. This code assignment corresponds to the available codes that the user input provided by Alice can map to during the call waiting condition.

TABLE 2

| Number | Message |
| --- | --- |
| 1 | "I am in important call now, will call you back in few minutes." |
| 2 | "I am in meeting, will call you back in few minutes." |

According to one embodiment, Alice may simply use a one touch mechanism to select "1" or "2" to notify Charlie of Alice's status, as well as specify any content to be provided to Charlie. In this case, during the call with Bob, upon receiving an indicator about the incoming call, Alice can provide a user input by pushing (or otherwise selecting) "2" such that the message, "I am in meeting, will call you back in few minutes" can be streamed or otherwise delivered to Charlie. As mentioned, in addition to these pre-recorded messages, Alice may specify other media (e.g., audio, video, images, etc.) to be forwarded to Charlie. For example, if Alice is expecting to speak with Charlie about a particular subject, e.g., a presentation (as a file), an image, or a video, that they are collaborating on, then Alice may provide this presentation or video to Charlie, so that Charlie is ready to discuss the subject when Alice completes her call with Bob.

Because Alice is engaged in a voice call with Bob (Alice deems this call to be important), a 710 BUSY message (which includes a field to indicate the selected pre-recorded message, etc.) is produced and forwarded, as in step 525, to SIP Proxy 125. This response code is sent in reply to the INVITE message from Charlie; this message signals, in one embodiment the SIP proxy 125 to open RTP stream and send the customized recorded message. According to one embodiment, the 710 BUSY message 550 is detailed in FIG. 5B. This message triggers retrieval of content for delivery to Charlie. As shown, a Custom Message ("Custom-Msg") field 551 specifies "2" as the selection for the content provided by Alice.

In step 527, SIP Proxy 125 provides a 200 OK message to Charlie. Thus, SIP Proxy 125 is now in communication with Charlie to provide a custom recorded message (step 529), from Alice, using RTP (step 531). After delivery of the content, SIP Proxy 125 signals termination of the call leg with Charlie using a BYE message, per step 533.

Figure 6A:
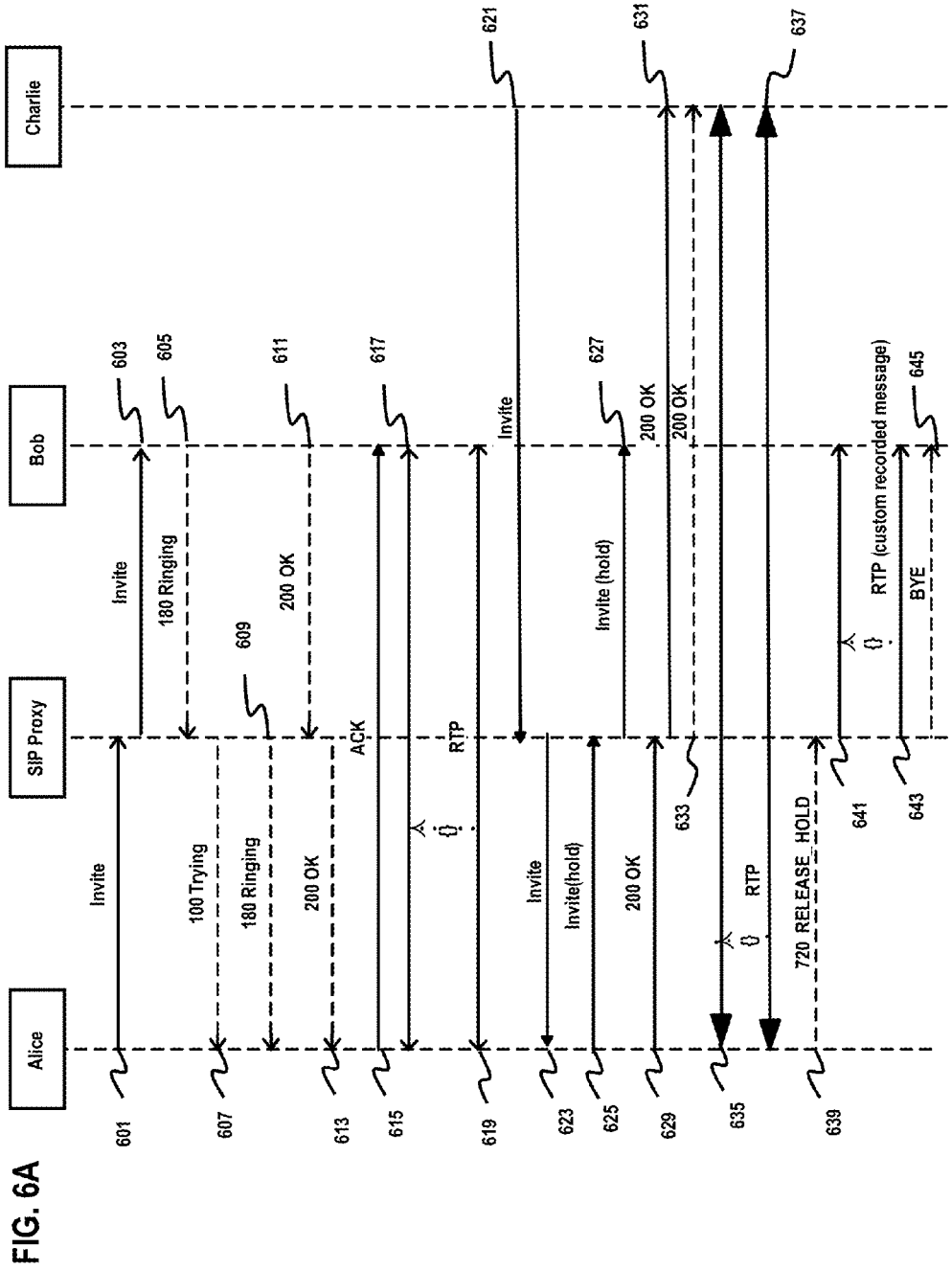
FIGS. 6A and 6B are diagrams, respectively, of a process for providing content to a caller on hold during a calling waiting condition using SIP, and an associated release hold message, according to various embodiments.
Figure 6B:

FIGS. 6A and 6B are diagrams, respectively, of a process for providing content to a caller on hold during a calling waiting condition using SIP, and an associated release hold message, according to various embodiments. In this example, Alice is engaged in a voice communication (e.g., VoIP call) with Bob, and thus establishment of this call proceeds according to steps 601-619, which resemble steps 501-519, respectively, of FIG. 5A. In this example, Alice and Bob are in VoIP call, and Alice receives a request to establish another call from Charlie.

In steps 621 and 623, Charlie sends an INVITE message to Alice using SIP Proxy 125. Alice switches the call over to Charlie by keeping Bob on hold. To implement this, Alice replies to the INVITE from Charlie by forwarding an INVITE (HOLD) message, as in step 625, to the SIP Proxy 125. SIP Proxy 125, in turn, relays the INVITE (HOLD) message Bob (step 627), effectively placing Bob on hold. Alice realizes that the call with Charlie is important, and therefore, initiates a switchover to the call with Charlie by sending a 200 OK, per steps 629-633.

In steps 635 and 637, Alice and Charlie can communicate. Concurrently, Alice, as in step 639, generates a 720 Release Hold message 650, shown in FIG. 6B, and forwards the message to SIP Proxy 125, which delivers content (specified by Alice, as described with respect to FIG. 5A), to Bob, per steps 641 and 643. The message 650 includes a Custom Message field 651 with a value of 3 to correspond to the selected pre-recorded message. This response code is sent while Bob is in the HOLD state. The 720 Release Hold message 650 signals SIP proxy 125 to open a RTP stream and send customized recorded message for the party who is on hold.

Table 3 illustrates an example of pre-recorded messages created by Alice, wherein these messages can be specified by Alice using, for example, the following:

TABLE 3

| Number | Message |
|---|---|
| 1 | "I am in important call now, will call you back in few minutes." |
| 2 | "I am in important call now, it will be done in a minute. Please stay on the line." |
| 3 | "I am in a meeting, will call you back in few minutes." |

In step 645, the process involves the SIP Proxy 125 terminating the call leg with Bob.

It is noted that conventionally, Alice would not have been able to communicate to Bob that she is engaged in an important call and that he should disconnect the phone. Hence, the above approach advantageously permits efficient use of network resources, as conventionally Bob may (not knowing that Alice is tending to an important matter) periodically attempt to call Alice, thereby expending network resources unnecessarily, not mention providing a frustrating user experience for Bob. Moreover, Alice does not have to disrupt her call with Charlie to notify Bob of her status.

The processes for providing custom call waiting with media messaging are described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
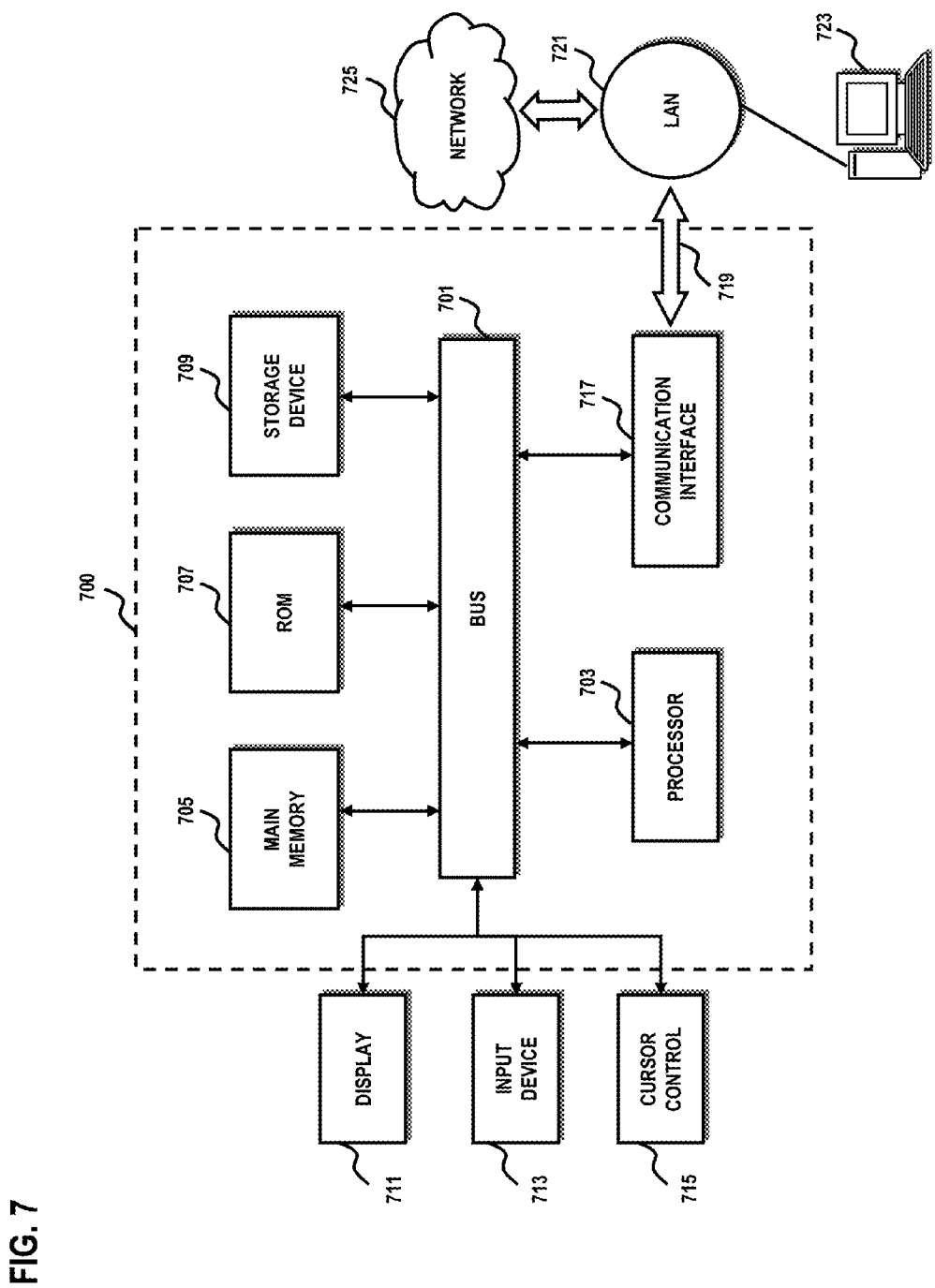
FIG. 7 is a diagram of a computer system that can be used to implement various exemplary embodiments.

FIG. 7 illustrates computing hardware (e.g., computer system) 700 upon which an embodiment according to the invention can be implemented. The computer system 700 includes a bus 701 or other communication mechanism for communicating information and one or more processors (of which one is shown) 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for adjusting cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving, by an apparatus associated with a service provider, a request from a first voice station to establish a voice communication session with a called party station;
   detecting, by the apparatus, that the called party station is currently in communication with a second voice station;
   prompting without involving a web browser, by the apparatus, the called voice station to select content designated from a call-waiting condition among a plurality of contents for presentation to a caller associated with the first or the second voice station;
   retrieving, by the apparatus, the content, in response to a user input from the called party station, wherein the content includes a pre-recorded message and information for later discussion, and the information for later discussion is other than identification of the called party, identification of the caller, a status of the voice communication session, and a status of the communication with the second voice station;
   transmitting, by the apparatus, the content to the first voice station without establishing the voice communication session, in response to the user input;
   retrieving, by the apparatus, via a network the selected content stored within a content database;
   forwarding the selected content from the apparatus to a proxy agent configured to transmit the content to the first voice station or the second voice station;
   receiving, by the apparatus, another request from the first voice station to establish a voice communication session with the called party station during the communication with the second voice station; and
   transmitting, by the apparatus, the content either to the second voice station when keeping the second voice station on hold while in the voice communication session with the first voice station, or to the second voice station while releasing the second voice station from hold thereby terminating the communication with the called party station, in response to the user input,
   wherein the information for later discussion includes presentation, an image, a video, or a combination of thereof.

2. A method according to claim 1, further comprising:
   initiating switchover to the first voice station by placing the second voice station on hold, while the content is being transmitted to the second voice station; and
   initiating termination of the communication with the second voice station after the transmission of the content.

3. A method according to claim 2, further comprising:
   receiving a release-hold message according to a session initiation protocol (SIP), wherein the release-hold message instructs the placement of the second voice station on hold, and instructs the termination of the communication with the second voice station.

4. A method according to claim 1, further comprising:
   receiving a busy message according to a session initiation protocol (SIP), wherein the busy message specifies a busy condition associated with the called party station, and instructs the retrieval of the content for delivery to the first voice station, and
   the content is transmitted to the first voice station without placing the second voice station on hold.

5. A method according to claim 1, further comprising:
   initiating switchover to the first voice station by placing the second voice station on hold, wherein the transmission of the content is to the second voice station without interrupting the communication with the first voice station; and
   initiating termination of the communication with the second voice station.

6. A method according to claim 1, further comprising:
   initiating switchover to the first voice station by placing the second voice station on hold, wherein the transmission of the content is to the second voice station without interrupting the communication with the first voice station, and the content includes, a status of the voice communication session with the first voice station, an expected hold period, and a hold request;
   after the switchover, initiating termination of the communication with the first voice station; and
   resuming the communication with the second voice station.

7. A method according to claim 1, wherein the information for later discussion is included in a file independent from the pre-recorded message.

8. An apparatus comprising:
   a communication interface configured to receive a request from a first voice station to establish a voice communication session with a called party station; and
   a processor coupled to the communication interface and configured to detect that the called party station is currently in communication with a second voice station, to prompt, without involving a web browser, the called voice station to select content designated from a call-waiting condition among a plurality of contents for presentation to a caller associated with the first or the second voice station, to retrieve the content, in response to a user input from the called party station, and to initiate transmission of the content to the first voice station without establishing the voice communication session, in response to the user input, wherein the processor is further configured to retrieve via a network the selected content stored within a content database, and to forward the selected content to a proxy agent configured to transmit the content to the first voice station or the second voice station, wherein the processor is further configured to receive another request from the first voice station to establish a voice communication session with the called party station during the communication with the second voice station; and to transmit the content either to the second voice station when keeping the second voice station on hold while in the voice communication session with the first voice station, or to the second voice station while releasing the second voice station from hold thereby terminating the communication with the called party station, in response to the user input, wherein the content includes a pre-recorded message and information for later discussion, and the information for later discussion is other than identification of the called party, identification of the caller, a status of the voice communication session, and a status of the communication with the second voice station, and wherein the information for later discussion includes presentation, an image, a video, or a combination of thereof.

9. An apparatus according to claim 8, wherein the processor is further configured to initiate switchover to the first voice station by placing the second voice station on hold, while the content is being transmitted to the second voice station, the processor being further configured to initiate termination of the communication with the second voice station after the transmission of the content.

10. An apparatus according to claim 9, wherein the communication interface is further configured to receive a release-hold message according to a session initiation protocol (SIP), wherein the release-hold message instructs the placement of the second voice station on hold, and instructs the termination of the communication with the second voice station.

11. An apparatus according to claim 8, wherein the communication interface is further configured to receive a message according to a session initiation protocol (SIP), wherein the busy message specifies a busy condition associated with the called party station, and instructs the retrieval of the content for delivery to the first voice station, and the content is transmitted to the first voice station without placing the second voice station on hold.

12. A method comprising:
initiating by a called party station establishment of a first voice communication session with a first voice station;
receiving at the called party station a request to establish a second voice communication session with a second voice station during the first voice communication session;
in response to a user input at the called party station, selecting, without involving a web browser, content that is pre-designated for a call-waiting condition among a plurality of contents, wherein the content is presented to a party associated with the second voice station without establishing the second voice communication session;

retrieving at the called party station the selected content stored locally;
forwarding the selected content from the called party station to a proxy agent configured to transmit the content to the first voice station or the second voice station;
receiving at the called party station another request to establish a third voice communication session with the second voice station during the first voice communication session, wherein the content is presented to a party associated with the first voice station while the first voice station is being released from hold, or to the party associated with the first voice station when keeping the first voice station on hold while in the second voice communication session, in response to the user input, wherein the content includes a pre-recorded message and information for later discussion, and the information for later discussion is other than identification of the called party, identification of the party, a status of the first voice communication session, and a status of the second voice communication session, and wherein the information for later discussion includes presentation, an image, a video, or a combination of thereof.

13. A method according to claim 12, further comprising:
generating a release-hold message according to a session initiation protocol (SIP), wherein the release-hold message instructs a SIP proxy server to place the first voice station on hold, and to terminate the first communication session.

14. A method according to claim 12, further comprising:
generating a busy message according to a session initiation protocol (SIP), wherein the busy message specifies a busy condition, and instructs the retrieval of the content by a SIP proxy server for delivery to the second voice station, and
the content is transmitted to the second voice station without placing the first voice station on hold.

15. An apparatus comprising:
a processor configured to initiate establishment of a first voice communication session with a first voice station; and
a communication interface coupled to the processor and configured to receive a request to establish a second voice communication session with a second voice station during the first voice communication session,
wherein the processor is further configured to, in response to a user input, select, without involving a web browser, content that is pre-designated for a call-waiting condition among a plurality of contents, and to present the content to a party associated with the second voice station without establishing the second voice communication session,
wherein the processor is further configured to retrieve the selected content stored locally, and to forward the selected content to a proxy agent configured to transmit the content to the first voice station or the second voice station,
wherein the processor is further configured to receive another request to establish a third voice communication session with the second voice station during the first voice communication session, and the content is presented to a party associated with the first voice station while releasing the first voice station from hold, or to the party associated with the first voice station when keeping the first voice station on hold while in the second voice communication session, in response to the user input, wherein the content includes a pre-recorded message and information for later discussion, and the information for later discussion is other than identification of the called party, identification of the party, a status of the first voice communication session, and a status of the second voice communication session, and wherein the information for later discussion includes presentation, an image, a video, or a combination of thereof.

16. An apparatus according to claim 15, wherein the processor is further configured to generate a release-hold message according to a session initiation protocol (SIP), wherein the release-hold message instructs a SIP proxy server to place the first voice station on hold, and to terminate the first communication session.

17. An apparatus according to claim 15, wherein the processor is further configured to generate a busy message according to a session initiation protocol (SIP), wherein the busy message specifies a busy condition, and instructs the retrieval of the content by a SIP proxy server for delivery to the second voice station, and the content is transmitted to the second voice station without placing the first voice station on hold.

* * * * *